United States Patent
Hilpert

(10) Patent No.: US 7,854,079 B2
(45) Date of Patent: Dec. 21, 2010

(54) ANIMAL MARKING TAG CONSISTING OF A SHELL COMPRISING TWO COLOURED ELEMENTS

(75) Inventor: Jean Jacques Hilpert, Vitre (FR)

(73) Assignee: Allflex Europe S.A.S., Vitre Cedex (FR)

( * ) Notice: Subject to any disclaimer, the term of this patent is extended or adjusted under 35 U.S.C. 154(b) by 0 days.

(21) Appl. No.: 11/664,671

(22) PCT Filed: Dec. 20, 2005

(86) PCT No.: PCT/EP2005/056978

§ 371 (c)(1),
(2), (4) Date: Apr. 4, 2007

(87) PCT Pub. No.: WO2006/067152

PCT Pub. Date: Jun. 29, 2006

(65) Prior Publication Data

US 2008/0047177 A1    Feb. 28, 2008

(30) Foreign Application Priority Data

Dec. 22, 2004  (FR) .................... 04 13725

(51) Int. Cl.
*G09F 3/00* (2006.01)
(52) U.S. Cl. ........................................ 40/301
(58) Field of Classification Search ......... 40/300, 40/301
See application file for complete search history.

(56) References Cited

U.S. PATENT DOCUMENTS

| | | | | |
|---|---|---|---|---|
| 495,270 A * | 4/1893 | Rozell | ............ | 40/301 |
| 4,344,240 A * | 8/1982 | Schiller | ............ | 40/662 |
| 4,597,208 A * | 7/1986 | Chevillot | ............ | 40/301 |
| 4,785,563 A * | 11/1988 | Friedman | ............ | 40/301 |
| 5,768,813 A * | 6/1998 | Reboul et al. | ............ | 40/301 |
| 6,145,225 A * | 11/2000 | Ritchey | ............ | 40/301 |
| 6,385,877 B1 * | 5/2002 | Wikan | ............ | 40/301 |
| 6,968,639 B2 * | 11/2005 | Destoumieux | ............ | 40/301 |
| 7,137,176 B2 * | 11/2006 | Flavio de Macedo | ......... | 24/104 |
| 2002/0095828 A1 | 7/2002 | Koopman et al. | | |
| 2006/0117619 A1 | 6/2006 | Costantini | | |
| 2006/0281846 A1 * | 12/2006 | Hager et al. | ............ | 524/430 |

FOREIGN PATENT DOCUMENTS

DE    202004003362 U1 *  6/2004

OTHER PUBLICATIONS

Translation of German publication DE 20 2004 003 362 U1.*

* cited by examiner

*Primary Examiner*—Joanne Silbermann
(74) *Attorney, Agent, or Firm*—Kauth, Pomeroy, Peck & Bailey LLP

(57) ABSTRACT

The invention relates to an animal marking and identification tag which is intended to receive a protrusion using an irreversible joining technique. The inventive tag comprises upper and lower shells which house an electronic member therebetween. The shells are assembled to one another by means of laser welding. The upper shell comprises at least two elements which are assembled such as to extend axially from one another, said elements including a dark base element which serves as an obstacle to the laser beam and a brightly-coloured top element which renders the tag visible.

18 Claims, 3 Drawing Sheets

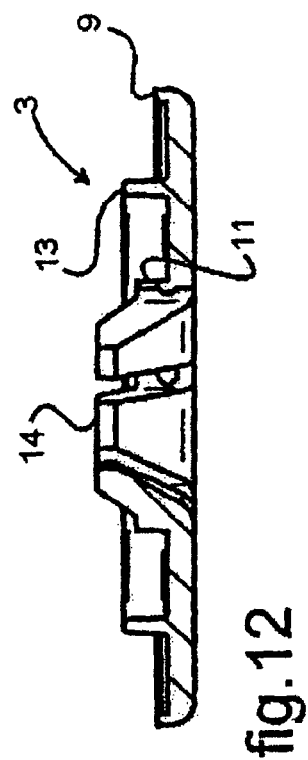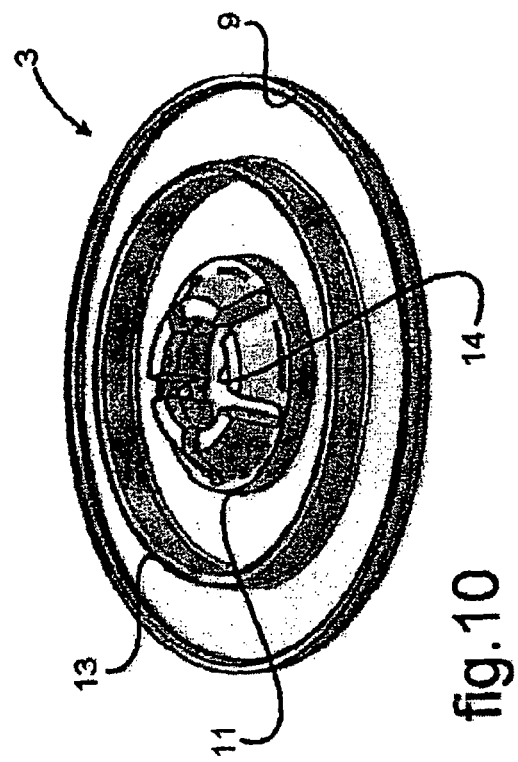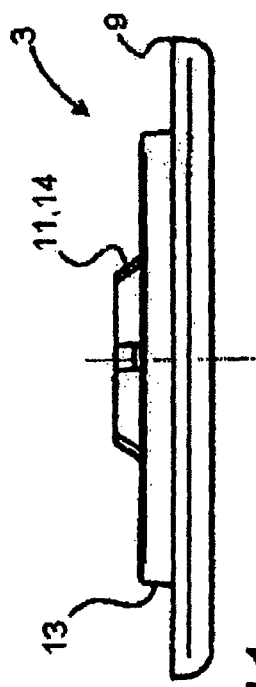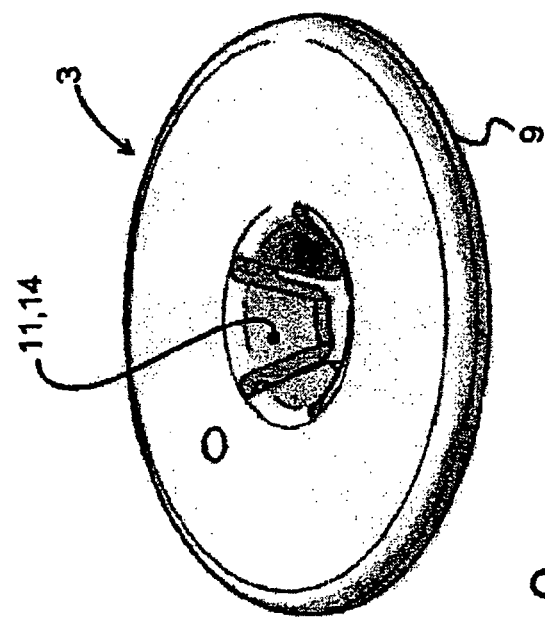

ANIMAL MARKING TAG CONSISTING OF A SHELL COMPRISING TWO COLOURED ELEMENTS

This is a non-provisional application claiming the benefit of International application number PCT/EP2005/056978 filed Dec. 20, 2005.

TECHNICAL FIELD OF THE INVENTION

The invention is in the field of the marking and identification of animals, and more particularly the field of ear tags for cattle equipped with an electronic identification device. It has as its object an electronic marking and identification button tag forming part of such an ear tag, intended to cooperate with a projection to enable it to be positioned on the animal.

STATE OF THE ART

Ear tags for the identification and marking of animals commonly combine a button tag for receiving a projection using an irreversible joining technique, to fix the tag permanently on the animal. Among these button tags, those housing an electronic device for marking and identifying the animal, such as a transponder or similar device, are known.

In particular FR2845564 (ALLFLEX) has proposed a button ear tag comprising two shells, one upper and one lower, which house the electronic device therebetween. The two shells, obtained by plastic moulding, are assembled to one another by laser welding. To enable the shells to be heated in the region of the weld, the lower shell is translucent to allow the laser beam to pass through freely, while the upper shell is tinted by an agent, such as carbon black, to serve as an obstacle to the beam.

It is also desirable to give the upper shell the highest possible contrast in relation to the markings it may receive from laser marking or any other process. The designers therefore endeavour to make the constituent material of the upper shell brightly coloured.

It appears, however, that tinting the upper shell with carbon-black makes it difficult to render it brightly coloured. As a result of this it is necessary to find a compromise between the ability of the upper shell to serve as an obstacle to the laser beam during the welding operation and rendering the colour of this shell sufficiently bright.

A further difficulty to be resolved lies in the design of a button tag enabling the positioning of the projection it is intended to receive, without at the same time compromising the reliability of their irreversible union.

SUMMARY OF THE INVENTION

The aim of the present invention is to provide a button tag for the marking and identification of animals of the type comprising two shells assembled to one another by means of laser welding and housing therebetween an electronic animal identification device. More particularly the object of the present invention is to provide a button tag such that it best combines the desired contrasted character of this button tag and its ability to enable welding of the two shells to one another by laser welding. A subsidiary object of the invention is to provide a button tag such that the arrangement optimally facilitates the operation of joining it irreversibly to a projection that it is intended to receive.

The button tag of the present invention is an animal marking and identification button tag which is intended to receive a projection using an irreversible joining technique. This button tag comprises two shells, one upper and the other lower, obtained by plastic moulding. These shells house therebetween an electronic device for identifying animals and are assembled to one another by means of laser welding. The lower shell is translucent to allow the laser beam to pass through while the upper shell is tinted to serve as an obstacle to the laser beam when the welding operation of the shells to one another takes place. According to the present invention, such a marking button tag is primarily recognisable in that the upper shell comprises at least two elements assembled such as to extend axially from one another, said elements including a dark base element which serves as an obstacle to the laser beam and a brightly coloured top element to give the upper shell the highest possible contrast in relation to the markings it may receive from laser marking or any other process.

It emerges from these provisions that the design of the button tag is no longer bound by the constraint of having to reconcile the tinting of the upper shell with carbon black to serve as an obstacle to the laser beam and colouring it brightly to bring out the contrast. More particularly, the region of the upper shell tinted with carbon black is restricted to a narrow region located at the base, while the main part formed by the top element can be brightly coloured so that markings that it may receive by laser marking or any other process will stand out.

The assembly of the base element and top element to one another is preferentially carried out by bi-injection of one of the elements onto the other element. It will be noted, however, that this assembly may also be carried out by another method such as gluing or heat assembly without thereby conceding an exception to the invention.

In the preferred case of assembling the base and top elements to one another by bi-injection, any one at least of the base element and the top element preferably comprises recesses for receiving the constituent material of the other element, in order to secure the elements to one another.

According to a preferred embodiment, the top element includes said recesses for receiving the material of the base element.

Preferably, the base element is surrounded externally for the most part by the top element in such a way as to hide its presence as much as possible when viewed from the exterior of the button tag, and to promote its contrasted character in relation to the markings it may receive.

The base element includes, in particular on its periphery, a shoulder provided with a groove to receive a rim provided on the periphery of the lower shell.

It will be seen that it is preferable to cause the external surfaces of the base of the top element, the shoulder of the base element and the rim of the lower shell to be flush with each other. These arrangements are such that when the button tag is assembled, the visible part of the base element is no larger than the shoulder provided on it.

The lower shell preferably comprises a median circular flange for locking the electronic device in place, the latter being, in particular, housed between the rim and the circular flange.

Furthermore, the lower shell preferably includes an axial sleeve for receiving said projection. This axial sleeve is preferentially of significantly constant thickness and is of conical shape, flared towards the base. Additionally, the sleeve is advantageously subdivided into elastically deformable axial fins, between which said projection is intended to pass. These arrangements facilitate the introduction and axial guidance of the projection when it is introduced into the button tag.

The sleeve preferably includes a cylindrical region at its base for receiving the end of a shaft provided on the base element. This cylindrical region is capable of being used to provide a welding region between the lower shell and the base element of the upper shell.

The axial extension of the sleeve is preferably of the same order as that of the shaft.

The constituent material of the lower shell and the elements comprising the upper shell is, in particular, polyamide.

More particularly, the constituent material of the lower shell is polyamide 12, that of the top element is glass fibre-reinforced polyamide 6.6, and that of the base element is polyamide 6.12.

DESCRIPTION OF THE DRAWINGS

The present invention will be better understood, and pertinent details brought out, on reading the following description, together with the accompanying drawings, in which:

FIG. 9 and FIG. 10 are perspective views of a lower shell which comprises the button tag shown in FIG. 1 to FIG. 4, seen from below and above respectively.

FIG. 11 is a side view of the lower shell shown in FIG. 9 and FIG. 10.

FIG. 12 is an axial section of the lower shell shown in FIG. 9 to FIG. 11.

In FIGS. 1 to 4 an animal marking and identification button tag is intended to receive a projection using an irreversible joining technique. The form of the button tag overall is that of a disc 1, which is extended upward by a chamber 2 to receive the end of the projection in order to fix them irreversibly to one another.

Figure 1:
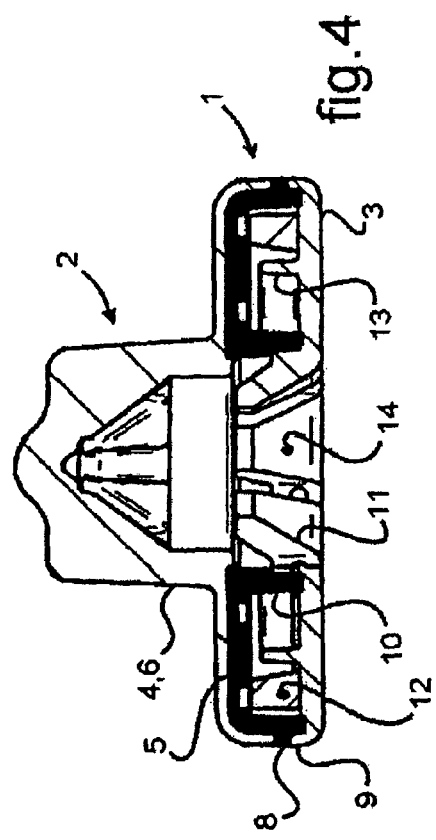
FIG. 1 and FIG. 2 are perspective views of a button tag according to a preferred embodiment of the invention, seen from below and above respectively.
Figure 2:
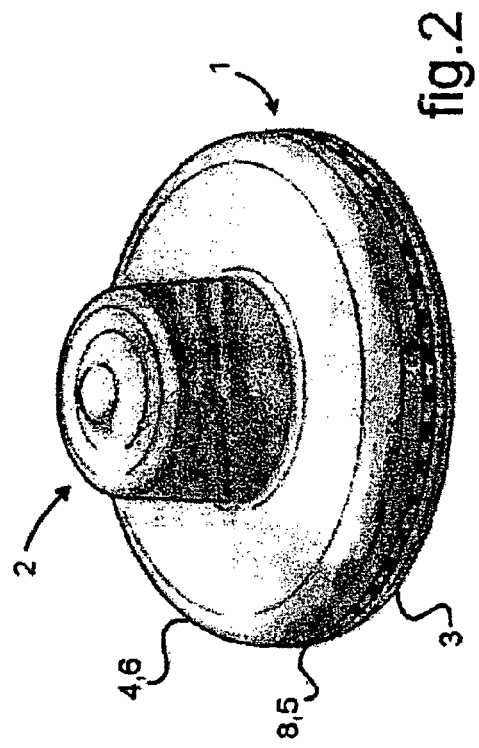
Figure 3:
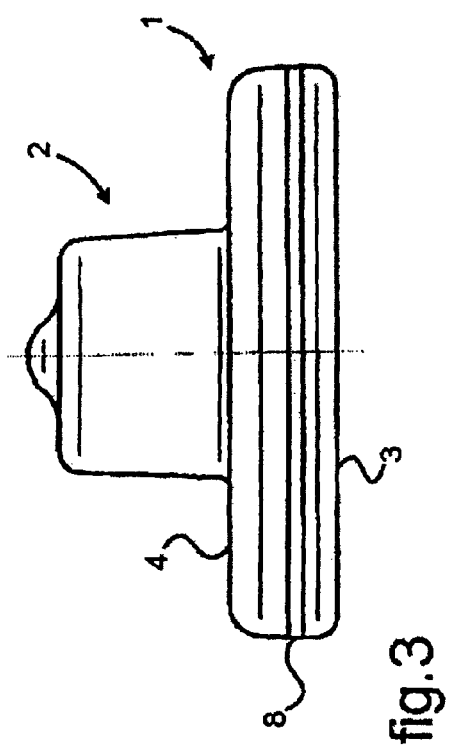
FIG. 3 is a side view of the button tag shown in FIG. 1 and FIG. 2.

This button tag comprises two shells 3 and 4 obtained by moulding of a plastic, in particular polyamide. These two shells, one lower 3 and the other upper 4, are assembled to one another by laser welding. To enable such an assembly, the lower shell 3 is translucent while the upper shell 4 comprises an axial region tinted with carbon black. Apart from this region, the upper shell 4 is tinted with a bright colour to form a contrast to the markings it may receive by laser marking or any other process.

To this end, and referring furthermore to FIGS. 5 to 8, the upper shell 4 itself comprises two elements assembled to one another. A base element 5 is tinted with carbon black, while a top element 6 is tinted with a bright colour. These two elements 5 and 6 are assembled to one another by the bi-injection of material when they are moulded.

Figure 5:
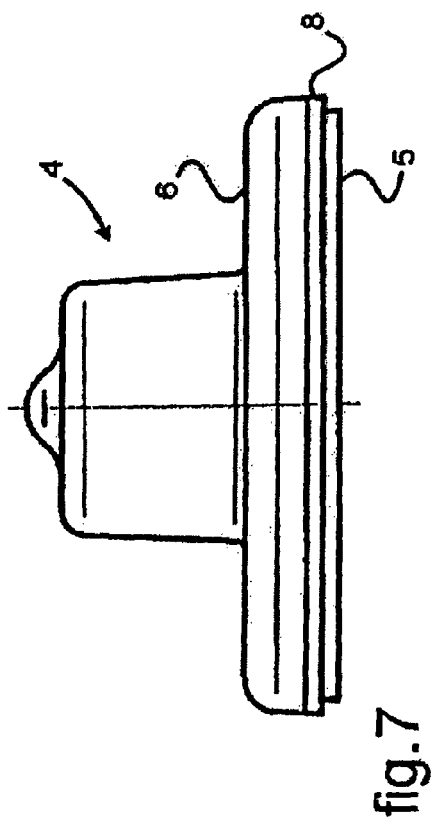
FIG. 5 and FIG. 6 are perspective views of an upper shell which comprises the button tag shown in the preceding figures, seen from below and above respectively.
Figure 6:
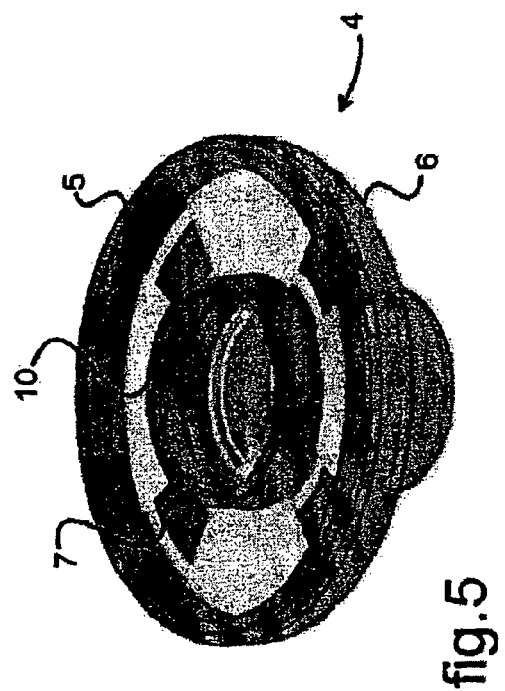

Referring more particularly to FIG. 5, the top element 6 comprises recesses 7 for receiving the constituent material of the base element 5, in order to facilitate the securing of the elements to one another. Furthermore, in the region of disc 1 of the button tag, the top element 6 surrounds for the most part the external surface of the base element 5, so as to limit the visible part of the latter as seen from the exterior of the tag.

Referring, furthermore, to FIGS. 9 to 12, the base element 5 is provided on its periphery with a shoulder 8 that enables a rim 9 that is provided on the periphery of the lower shell 3 to be placed in axial abutment. In addition, the base element 5 comprises a shouldered sleeve 10 to receive the base of a shaft 11 provided on the lower shell 3.

The welding of the two shells 3 and 4 to one another is carried out in two regions of union, one located in the region of the peripheral shoulder 8 of the base element 5 of the upper shell 4, which receives the rim 9 of the lower shell 3, the other located at the base of the sleeve 10, which receives the base of the shaft 11 of the lower shell 3.

Returning to FIGS. 1 to 4, it appears that in the region of the disc 1 of the button tag, the external surfaces of the top element 6, the base element 5 and the rim 9 are flush, allowing no more of the base element 5 to be visible than the external surface of the shoulder 8 provided upon it to receive the rim 9 of the lower shell 3.

Figure 4:
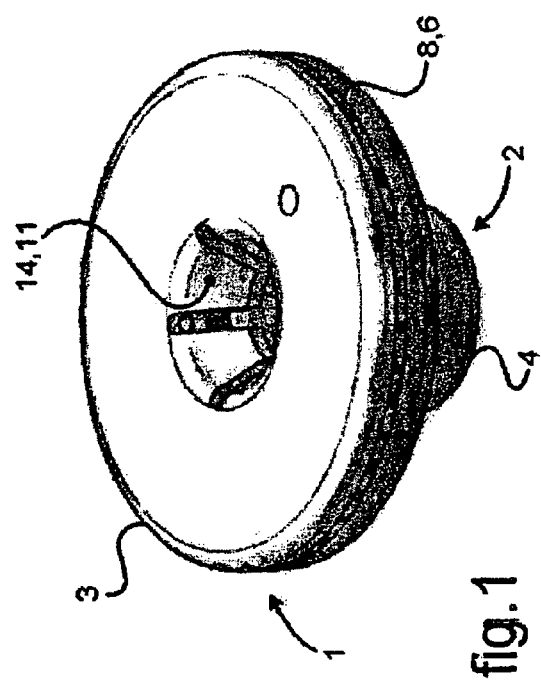
FIG. 4 is an axial section of the button tag shown in FIGS. 1 to 3.
Figure 7:
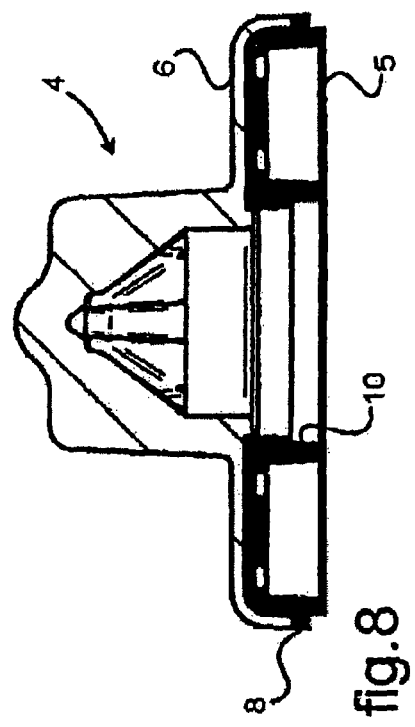
FIG. 7 is a side view of the upper shell shown in FIG. 5 and FIG. 6.
Figure 8:
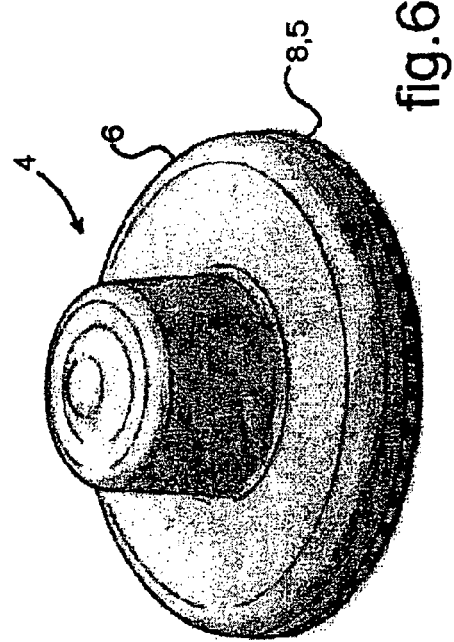
FIG. 8 is an axial section of the upper shell shown in FIG. 5 to FIG. 7.

As shown in FIG. 4, the shells 3 and 4 comprising the button tag house a transponder 12, or other similar electronic animal identification device therebetween. This transponder 12 is located between the external wall of the base element 5 of the upper shell 4, and a circular median flange 13 provided on the lower shell 3.

Returning, furthermore, to FIGS. 9 to 12, the shaft 11 is of significantly constant thickness and of conical shape, flared towards the base. This shaft 11 is subdivided into elastically deformable axial fins 14, to facilitate the introduction and guidance of the projection within the button tag. These fins 14 are in particular formed by axially formed incisions in the conical wall of the shaft 11, below the cylindrical region provided in the latter for receiving the base of the sleeve 10 of the base element 5 of the upper shell 4. It will be noted that the axial extension of the shaft 11 is of the same order as that of the sleeve 10.

The invention claimed is:

1. Animal marking and identification button tag which is intended to receive a projection using an irreversible joining technique, this button tag including:
    two molded plastic shells, one upper and the other lower;
    an electronic device for identifying an animal housed between the upper and lower molded plastic shells; and
    a laser weld joining the upper plastic shell to the lower plastic shell;
    wherein:
    the lower shell is translucent to allow the laser beam to pass through during creating of the laser weld joining the upper plastic shell to the lower plastic shell; and
    the upper plastic shell includes:
    a base element in an axial region, the base element being tinted to serve as an obstacle to the laser beam during creation of the laser weld joining the upper plastic shell to the lower plastic shell; and
    a top element tinted another, lighter color assembled such as to extend axially from the base element.

2. Animal marking and identification button tag according to claim 1, wherein the assembly of the base element and top element to one another is carried out by bi-injection of one of the elements onto the other element.

3. Animal marking and identification button tag according to claim 2, wherein any one at least of the base element and the top element includes recesses for receiving the constituent material of the other element, in order to secure the elements to one another.

4. Animal marking and identification button tag according to claim 3, wherein the top element includes said recesses for receiving the material of the base element.

5. Animal marking and identification button tag according to claim 1 wherein the base element is surrounded externally in the most part by the top element.

6. Animal marking and identification button tag according to claim 5 wherein the base element includes on its periphery a shoulder provided with a groove to receive a rim provided on the periphery of the lower shell.

7. Animal marking and identification button tag according to claim 6, wherein the external surface of the base of the top element, the shoulder of the base element and the rim of the lower shell are flush with each other, such that when the button tag is assembled, the visible part of the base element is no larger than the shoulder provided on it.

8. Animal marking and identification button tag according to claim 5, wherein the external surface of the base of the top element, the shoulder of the base element and the rim of the lower shell are flush with each other, such that when the button tag is assembled, the visible part of the base element is no larger than the shoulder provided on it.

9. Animal marking and identification button tag according to claim 1 wherein the lower shell includes a median circular flange for locking the electronic device in place.

10. Animal marking and identification button tag according to claim 1 wherein the constituent material of the lower shell and the elements comprising the upper shell is polyamide.

11. Animal marking and identification button tag according to claim 10, wherein the constituent material of the lower shell is polyamide 12, that of the top element is glass fiber-reinforced polyamide 6.6, and that of the base element is polyamide 6.12.

12. Animal marking and identification button tag according to claim 1, wherein the lower plastic shell is configured to introduce and guide said projection within the button tag.

13. Animal marking and identification button tag according to claim 12, wherein the lower shell includes an axial sleeve for receiving said projection.

14. Animal marking and identification button tag according to claim 13, wherein the axial sleeve is of significantly constant thickness and is of conical shape, flared towards the base.

15. Animal marking and identification button tag according to claim 14, wherein the sleeve is subdivided into elastically deformable axial fins, between which said projection is intended to pass.

16. Animal marking and identification button tag according to claim 13 wherein the sleeve includes a cylindrical region at its base for receiving the end of a shaft provided on the base element.

17. Animal marking and identification button tag according to claim 16, wherein the axial extension of the sleeve is of the same order as that of the shaft.

18. A method of forming an animal marking and identification button tag which is intended to receive a projection using an irreversible joining technique, said method including:
forming a lower molded plastic shell;
forming an upper molded plastic shell having a base element in an axial region, the base element being tinted to serve as an obstacle to a laser beam during a laser welding process for joining the upper plastic shell to the lower plastic shell, and a top element tinted another, lighter color assembled such as to extend axially from the base element;
positioning an electronic device for identifying an animal between the upper and lower molded plastic shells; and
laser welding the upper plastic shell to the lower plastic shell;
wherein:
during the laser welding process, the laser beam passes through the lower plastic shell, which is translucent to allow the laser beam to pass through, and is absorbed by the base element of the upper plastic shell.

* * * * *